United States Patent
Takemura et al.

(10) Patent No.: US 10,044,027 B2
(45) Date of Patent: Aug. 7, 2018

(54) ELECTRICAL APPLIANCE

(71) Applicant: Semiconductor Energy Laboratory Co., Ltd., Kanagawa-ken (JP)

(72) Inventors: Yasuhiko Takemura, Kanagawa (JP); Tamae Moriwaka, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/471,906

(22) Filed: Aug. 28, 2014

(65) Prior Publication Data

US 2014/0370184 A1 Dec. 18, 2014

Related U.S. Application Data

(63) Continuation of application No. 13/211,577, filed on Aug. 17, 2011, now abandoned.

(30) Foreign Application Priority Data

Aug. 19, 2010 (JP) .................. 2010-183888

(51) Int. Cl.
*H01M 4/1393* (2010.01)
*H01M 4/36* (2006.01)
(Continued)

(52) U.S. Cl.
CPC ........... *H01M 4/1393* (2013.01); *B29B 15/00* (2013.01); *H01M 4/366* (2013.01); *H01M 4/60* (2013.01);
(Continued)

(58) Field of Classification Search
CPC .......... H01M 4/02; H01M 4/625; H01M 4/06; H01M 4/13; H01M 4/14; H01M 4/24;
(Continued)

(56) References Cited

U.S. PATENT DOCUMENTS 7,179,561 B2 2/2007 Niu et al.
7,270,795 B2 9/2007 Kawakami et al.
(Continued)

FOREIGN PATENT DOCUMENTS

CN 001787259 A 6/2006
CN 001316650 C 5/2007
(Continued)

OTHER PUBLICATIONS

Liu, Qingfeng; Fujigaya, Tsuyohiko; Cheng, Hui-Ming; Nakashima, Naotoshi; Free-Standing Highly Conductive Transport Ultrathin Single-Walled Carbon Nanotube Films, J. Am. Chem. Soc., vol. 132, No. 46, 2010, pp. 16581-16586.*

(Continued)

*Primary Examiner* — Ula C Ruddock
*Assistant Examiner* — Thomas H. Parsons
(74) *Attorney, Agent, or Firm* — Husch Blackwell LLP (57) ABSTRACT

An object is to increase the conductivity of an electrode including active material particles and the like, which is used for a battery. Two-dimensional carbon including 1 to 10 graphenes is used as a conduction auxiliary agent, instead of a conventionally used conduction auxiliary agent extending only one-dimensionally at most, such as graphite particles, acetylene black, or carbon fibers. A conduction auxiliary agent extending two-dimensionally has higher probability of being in contact with active material particles or other conduction auxiliary agents, so that the conductivity can be improved.

6 Claims, 4 Drawing Sheets

(51) Int. Cl.
  *H01M 4/60*  (2006.01)
  *H01M 4/62*  (2006.01)
  *H01M 4/66*  (2006.01)
  *B29B 15/00*  (2006.01)
  *H01M 4/02*  (2006.01)

(52) U.S. Cl.
  CPC ........... *H01M 4/625* (2013.01); *H01M 4/661* (2013.01); *H01M 2004/021* (2013.01)

(58) Field of Classification Search
  CPC .... H01M 4/1393; H01M 4/366; H01M 4/133; H01M 4/663
  See application file for complete search history.

(56) References Cited

U.S. PATENT DOCUMENTS

| | | | |
|---|---|---|---|
| 7,745,047 B2 | 6/2010 | Zhamu et al. | |
| 7,824,807 B2 | 11/2010 | Yuasa et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 7,988,941 B2 | 8/2011 | Choi et al. | |
| 8,003,257 B2 | 8/2011 | Takeuchi et al. | |
| 8,075,864 B2 | 12/2011 | Choi et al. | |
| 8,278,011 B2 | 10/2012 | Zhu et al. | |
| 9,187,332 B2 | 11/2015 | Yoon et al. | |
| 9,527,742 B2 | 12/2016 | Choi et al. | |
| 2004/0247872 A1 | 12/2004 | Sudo et al. | |
| 2007/0131915 A1 | 6/2007 | Stankovich et al. | |
| 2008/0254296 A1 | 10/2008 | Handa et al. | |
| 2009/0110627 A1* | 4/2009 | Choi | B82Y 30/00 423/447.1 |
| 2010/0021819 A1* | 1/2010 | Zhamu et al. | 429/231.8 |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0059599 A1* | 3/2011 | Ward | H01L 21/02491 438/507 |
| 2011/0111303 A1 | 5/2011 | Kung et al. | |
| 2011/0118123 A1 | 5/2011 | Lee et al. | |
| 2011/0121240 A1 | 5/2011 | Amine et al. | |
| 2011/0135884 A1* | 6/2011 | Lettow et al. | 428/174 |
| 2011/0143101 A1 | 6/2011 | Sandhu | |
| 2011/0159372 A1 | 6/2011 | Zhamu et al. | |
| 2011/0227000 A1 | 9/2011 | Ruoff et al. | |
| 2011/0229795 A1 | 9/2011 | Niu et al. | |
| 2011/0244210 A1 | 10/2011 | Choi et al. | |
| 2011/0269016 A1 | 11/2011 | Takeuchi et al. | |
| 2012/0021224 A1* | 1/2012 | Everett et al. | 428/408 |
| 2012/0045692 A1 | 2/2012 | Takemura et al. | |
| 2012/0315550 A1 | 12/2012 | Liu et al. | |

FOREIGN PATENT DOCUMENTS

| | | |
|---|---|---|
| CN | 101016153 A | 8/2007 |
| CN | 101562248 A | 10/2009 |
| CN | 101654243 A | 2/2010 |
| CN | 101752561 A | 6/2010 |
| CN | 101800310 A | 8/2010 |
| EP | 1 440 932 A2 | 7/2004 |
| EP | 2 055 673 A1 | 5/2009 |
| EP | 2 325 138 A2 | 5/2011 |
| EP | 2 327 662 A1 | 6/2011 |
| EP | 2 511 973 A1 | 10/2012 |
| JP | 06-060870 A | 3/1994 |
| JP | 2000-277146 A | 10/2000 |
| JP | 2000-294230 A | 10/2000 |
| JP | 2002-260664 A | 9/2002 |
| JP | 2003-142076 A | 5/2003 |
| JP | 2003-157830 A | 5/2003 |
| JP | 2006-265751 A | 10/2006 |
| JP | 2007-042620 A | 2/2007 |
| JP | 2009-062241 A | 3/2009 |
| JP | 2009-107921 A | 5/2009 |
| JP | 2009-524567 | 7/2009 |
| JP | 2009-176721 A | 8/2009 |
| JP | 2011-503804 | 1/2011 |
| JP | 2011-048992 A | 3/2011 |
| JP | 2011-517053 | 5/2011 |
| JP | 2011-105593 A | 6/2011 |
| JP | 2011-121828 A | 6/2011 |
| JP | 2012-064571 A | 3/2012 |
| KR | 2004-0068026 A | 7/2004 |
| KR | 2009-0026568 A | 3/2009 |
| WO | WO 2003/028128 A2 | 4/2003 |
| WO | WO 2006/062947 A2 | 6/2006 |
| WO | WO 2007/004728 A1 | 1/2007 |
| WO | WO 2007/061945 A2 | 5/2007 |
| WO | WO 2009/035213 A1 | 3/2009 |
| WO | WO 2009/061685 A1 | 5/2009 |
| WO | WO 2009/127901 A1 | 10/2009 |
| WO | WO 2009/144600 A2 | 12/2009 |
| WO | WO 2012/023464 A1 | 2/2012 |

OTHER PUBLICATIONS

An, Sung Jin; Zhu, Yanwu; Lee, Sun Hwa; Stoller, Meryl D.; Emilsson, Tryggvi; Park, Sungjin; Velamakanni, Aruna; An, Jinho; Ruoff, Rodney S.; Thin Film Fabrication and Simultaneous Anodic Reduction of Deposited Graphene Oxide Platelets by Electrophetric Deposition; J. Phys. Chem. Lett. 2010, 1, 1259-1263.*
Chinese Office Action re Application No. CN 201180040121.3, dated Nov. 19, 2014.
Blake, P. et al., "Graphene-Based Liquid Crystal Device," NANO LETTERS, Apr. 30, 2008, vol. 8, No. 6, pp. 1704-1708.
International Search Report re Application No. PCT/JP2011/068214, dated Nov. 29, 2011.
Written Opinion re Application No. PCT/JP2011/068214, dated Nov. 29, 2011.
Zhou, X. et al., "Graphene Modified LiFePO4 Cathode Materials for High Power Lithium Ion Batteries," Journal of Materials Chemistry, 2011, vol. 21, pp. 3353-3358.
Su, F.-Y. et al., "Flexible and Planar Graphene Conductive Additives for Lithium-Ion Batteries," Journal of Materials Chemistry, 2010, vol. 20, pp. 9644-9650.
Yu, G. et al., "Solution-Processed Graphene/MnO2 Nanostructured Textiles for High-Performance Electrochemical Capacitors," Nano Letters, 2011, vol. 11, No. 7, pp. 2905-2911.
Chinese Office Action re Application No. CN 201180040121.3, dated Jul. 27, 2015.
Zhou, M. et al., "Controlled Synthesis of Large-Area and Patterned Electrochemically Reduced Graphene Oxide Films," Chemistry A European Journal, May 14, 2009, vol. 15, No. 25, pp. 6116-6120.
Dreyer, D.R. et al., "The Chemistry of Graphene Oxide," Chemical Society Reviews, Nov. 3, 2009, vol. 39, No. 1, pp. 228-240.
Korean Office Action re Application No. KR 2011-0081526, dated Sep. 6, 2017.
Chinese Office Action re Application No. CN 201610801763.5, dated Apr. 2, 2018.

* cited by examiner

FIG. 1

Active Material particle

Two-Dimensional Carbon

FIG. 2

Active Material particle

Acetylene Black

ELECTRICAL APPLIANCE

This application is a continuation of copending U.S. application Ser. No. 13/211,577, filed on Aug. 17, 2011 which is incorporated herein by reference.

BACKGROUND OF THE INVENTION

1. Field of the Invention

The present invention relates to a variety of electrical appliances, particularly a battery, including a particulate material.

2. Description of the Related Art

In a manganese battery, an alkaline battery, a nickel-hydride battery, a lithium ion secondary battery, and the like, a particulate material is used as an active material for storing electricity. In some cases where the particulate material (active material particles) has low conductivity, a conduction auxiliary agent such as acetylene black, graphite particles, or carbon fibers is mixed into the material so as to increase the conductivity (see Patent Document 1).

Specifically, the active material particles, the conduction auxiliary agent, and a binder are mixed, and the mixture is applied onto a current collector, molded, and then dried to be used as an electrode such as a positive electrode or a negative electrode.

A procedure similar to the above is applied to other electrical appliances including a particulate material, without limitation to a battery, to improve its conductivity.

REFERENCE

Patent Document

[Patent Document 1] Japanese Published Patent Application No. H6-60870
[Patent Document 2] United States Published Patent Application No. 2009/0110627
[Patent Document 3] United States Published Patent Application No. 2007/0131915

Non-Patent Document

[Non-Patent Document 1] P. Blake et. al., "Graphene-Based Liquid Crystal Device", Nano Lett. 8, 1704 (2008)

SUMMARY OF THE INVENTION

In the case where graphite particles are used as a conduction auxiliary agent in a manganese dry battery or the like, natural graphite is generally used by reason of cost. However, in that case, iron, lead, copper, or the like contained in the graphite particles as an impurity reacts with an active material or a current collector, so that the potential and the capacitance of the battery are decreased. In addition, natural graphite has poor electrolyte retention characteristics. These factors cause a problem of reduction in use efficiency of the active material.

Further, when graphite is used as a conduction auxiliary agent for a positive electrode of a battery, such as a lithium ion battery, in which charge and discharge are performed by transfer of alkali ions, there is a problem in that graphite particles absorb the alkali ions, thereby decreasing the use efficiency of current.

Meanwhile, acetylene black contains fewer impurities and has a better developed chain structure than graphite particles and therefore has excellent electrolyte retention characteristics, thereby improving the use efficiency of an active material. However, a battery including acetylene black as a conduction auxiliary agent has a disadvantage that the potential and discharge capacitance are greatly reduced, since a functional group having a high reducing property with respect to an active material exists on a surface of acetylene black.

Figure 2:
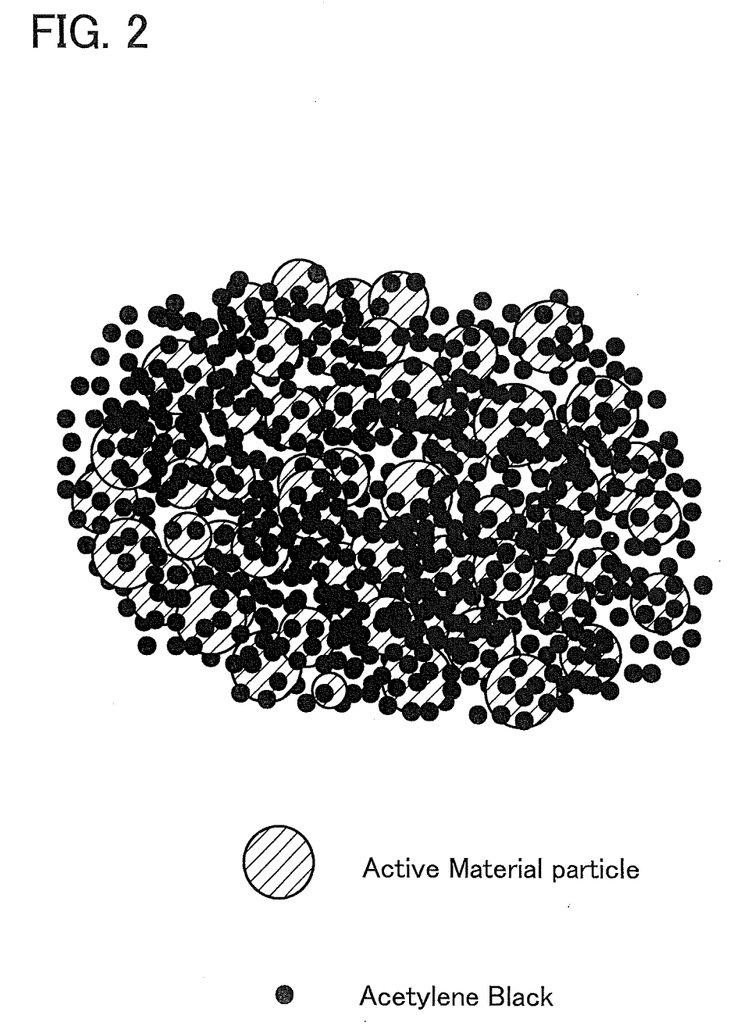
FIG. 2 is a schematic view of acetylene black particles and active material particles.

Furthermore, since acetylene black is microparticles with diameters of about 10 nm, current is conducted from the active material particles to a current collector by hopping between acetylene black particles. Therefore, resistance is generated every time hopping occurs. FIG. 2 schematically illustrates an example where acetylene black is used as a conduction auxiliary agent. In the drawing, particles shown by oblique lines are active material particles and black dots are acetylene black particles. The above problem is also caused in the case where graphite particles are used.

On the other hand, in the case where carbon fibers are used as a conduction auxiliary agent as in Patent Document 1, it is expected that a decrease in conductivity due to the above-described excessive hopping is suppressed. However, the active material and the current collector are not connected via a single carbon fiber; thus, current is conducted by hopping between a plurality of carbon fibers.

Even if all the carbon fibers are aligned in one direction, the probability of carbon fibers being in contact with (or sufficiently close to) each other is less than 50%, which is insufficient in terms of conductivity.

Moreover, it is difficult to align all the carbon fibers in one direction in an electrode which is shaped by mixture of a binder; thus, the actual conductivity is lower than that in the above assumption.

Figure 1:
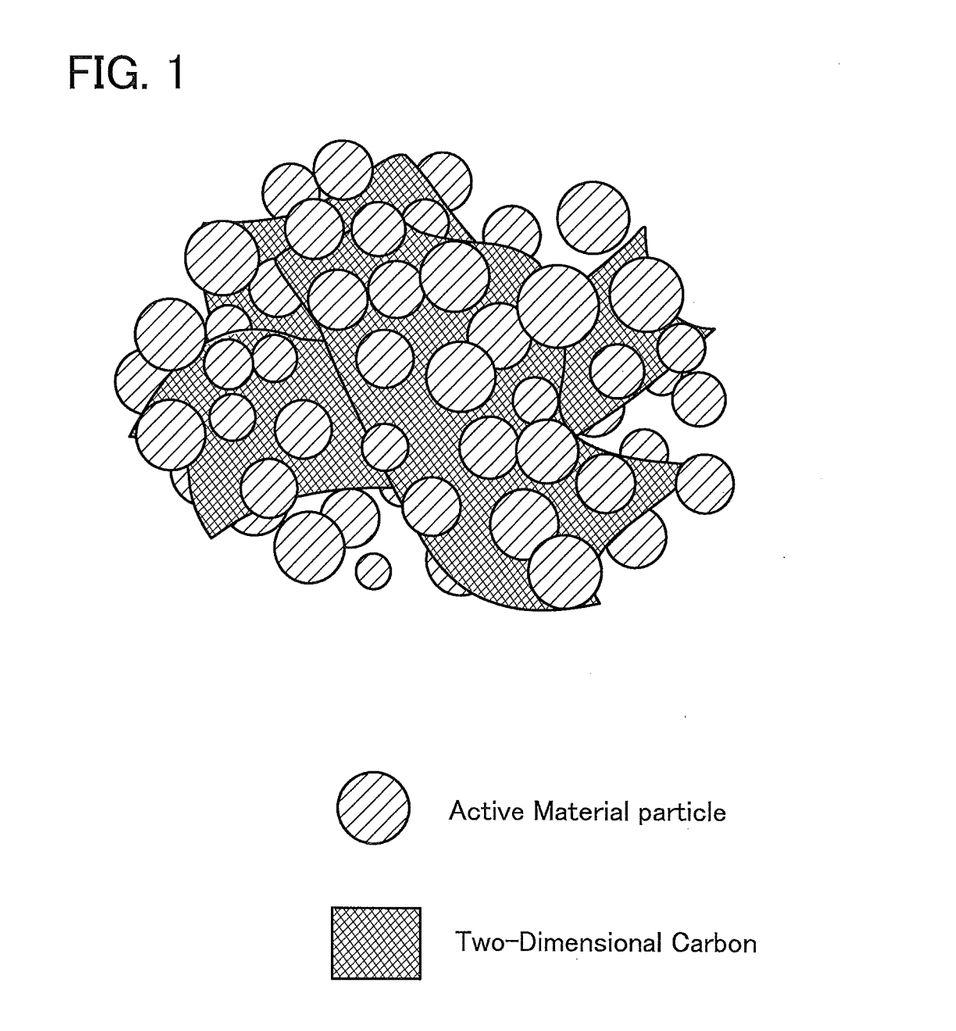
FIG. 1 is a schematic view of two-dimensional carbon and active material particles.

The conductivity can be improved by using two-dimensional carbon including 1 to 100, preferably 1 to 10 graphenes as a conduction auxiliary agent. Note that in this specification, a graphene refers to a sheet of carbon molecules having $sp^2$ bonds with a thickness of one atomic layer. FIG. 1 is a schematic view illustrating the case where such a conduction auxiliary agent extending two-dimensionally is used. Here, three sheets of two-dimensional carbon and a large number of active material particles form a complicated structure, whereby the conductivity can be increased.

As described below, in the case of using a material extending two-dimensionally and whose thickness can be ignored as a conduction auxiliary agent, an equivalent effect can be obtained even when the volume of the conduction auxiliary agent is reduced. Thus, the volume of the conduction auxiliary agent occupying the electrode can be reduced, whereby the volume of the electrode can be reduced. For example, the thickness of two-dimensional carbon including 10 graphenes is about 3 nm.

A graphene has a characteristic of achieving high conductivity after being subjected to doping treatment. A value of greater than or equal to $10^6$ S/cm is obtained, which is higher than or equal to the conductivity of silver. This fact is advantageous in using the graphene as a conduction auxiliary agent. Doping can be performed by partly oxidizing the graphene or adding an alkali metal such as potassium to the graphene.

When a conduction auxiliary agent including two-dimensional carbon is used for an electrical appliance, such as a lithium ion secondary battery, in which charge and discharge are performed by transfer of alkali metal ions or alkaline earth metal ions, there are some cases where doping with the two-dimensional carbon is performed automatically, whereby the conductivity is improved.

The conductivity of two-dimensional carbon is improved by stacking more graphenes. However, a stack of 101 or more graphenes is not preferable because it has too strong graphitic characteristics.

In the case of using a material extending two-dimensionally as a conduction auxiliary agent, its typical length may be greater than or equal to 100 nm and less than or equal to 100 μm, preferably greater than or equal to 1 μm and less than or equal to 20 μm. In particular, in the case of using two-dimensional carbon, two-dimensional carbon with a typical length of less than or equal to 100 nm has semiconductor characteristics and thus has low conductivity. On the other hand, two-dimensional carbon with a typical length of greater than or equal to 100 nm has electric characteristics equivalent to those of a good conductor. However, in order to reduce the number of times of hopping conduction (transfer of electrons from two-dimensional carbon to another two-dimensional carbon), the typical length is preferably greater than or equal to 1 μm.

In this specification, a typical length is defined as the square root of the area of two-dimensional carbon. Although two-dimensional carbon may actually have various shapes, here, the length is defined assuming that all two-dimensional carbon has rectangular shapes. Accordingly, a typical length of rectangular two-dimensional carbon with a long side of 2 mm and a short side of 50 nm (these values are not within the above preferable range) is 10 μm (this value is within the above preferable range), for example.

Note that a conduction auxiliary agent may include, in addition to two-dimensional carbon, acetylene black particles or carbon particles (such as carbon nanofibers) extending one-dimensionally, at a volume greater than or equal to 0.1 times and less than or equal to 10 times that of two-dimensional carbon.

With the above structure, the resistance of the electrical appliance can be reduced. In particular, when a conduction auxiliary agent according to the present invention is used for a primary battery or a secondary battery, it is more preferable that the resistance (internal resistance) of an electrode be lower, which is suitable for applications where a large amount of power is required instantaneously.

For example, a power source of an electric vehicle consumes a relatively small amount of power when the electric vehicle is driven on flat ground. However, a large amount of power is consumed under hard acceleration or in ascending a slope. In that case, the power source needs to feed a large amount of current; however, when internal resistance is high, a significant voltage drop and also a loss due to internal resistance are caused.

As a result, part of the power which is expected to be available is lost. In other words, although stored power can be almost fully used if the vehicle is driven on flat ground, part of the power is lost in ascending a slope or under acceleration. Reduction in internal resistance can suppress such loss.

The reason why the conductivity can be improved by using a material extending two-dimensionally and whose thickness can be ignored will be described with reference to FIGS. 3A to 3F.

Figure 3A:
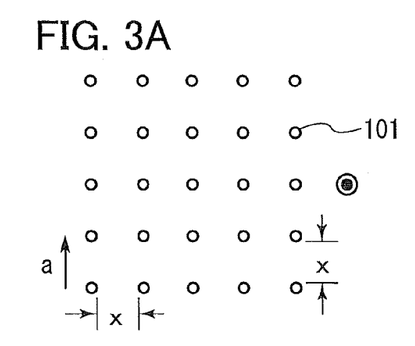
FIGS. 3A to 3F are views for describing the difference between the conductivity of carbon fibers and that of two-dimensional carbon.

FIGS. 3A to 3D are views for describing the reason why the conductivity is not sufficiently improved by using a material extending one-dimensionally, for example, carbon fibers. FIG. 3A illustrates carbon fibers 101 arranged in a certain ideal state. In other words, the plurality of carbon fibers 101 are arranged orderly in a square grid pattern. The length directions of the carbon fibers 101 are perpendicular to the paper.

A distance between a surface of one carbon fiber and a surface of another carbon fiber is x. That is, a diameter of a carbon fiber is obtained by subtraction of x from a grid interval. There is an optimal value for the x depending on a particle size of an active material or the like.

Figure 3B:
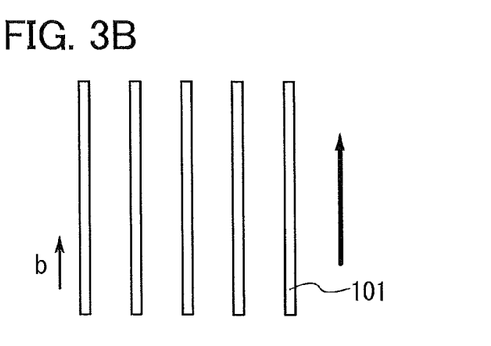

FIG. 3B illustrates the carbon fibers observed in a direction indicated by an arrow "a" in FIG. 3A. In FIG. 3B, an arrow "b" indicates a direction in which the carbon fibers are observed in FIG. 3A. The case is considered where the carbon fibers 101 are in contact with upper carbon fibers 102. For example, with an arrangement illustrated in FIG. 3C, it seems that the carbon fibers 101 are in close contact with the upper carbon fibers 102, so that the resistance therebetween can be minimum.

Figure 3C:
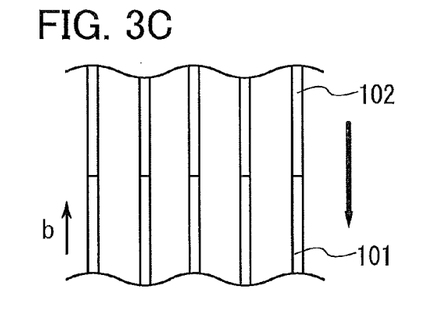
Figure 3D:
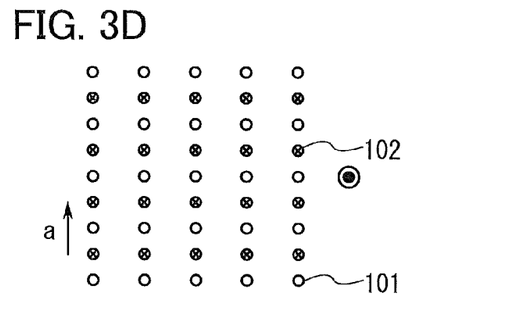

However, there may be a case where the carbon fibers 101 and the upper carbon fibers 102 do not overlap (are not in contact) with each other at all when seen from another angle (indicated by the arrow "b"), as illustrated in FIG. 3D. Thus, the probability of such an orderly arranged carbon fiber grid overlapping with an upper similar carbon fiber grid is not high.

In FIGS. 3A to 3D, the diameters of the carbon fibers 101 and 102 are set to one-tenth of the grid intervals. In that case, the probability of the carbon fibers 101 at least partly overlapping (being in contact) with the upper carbon fibers 102 is about 12.6%.

Meanwhile, the probability is greatly increased when a material extending two-dimensionally is used. For example, a structure illustrated in FIG. 3E (two-dimensional carbon 103) is assumed, in which a material extending two-dimensionally is bent in a region corresponding to the region in FIG. 3A. Here, the bending margin is set to x. This is to obtain an effect equivalent to that in FIG. 3A.

It can be understood that if there is two-dimensional carbon above the two-dimensional carbon 103, bended similarly thereto, it is impossible that they are not in contact with each other at all. FIGS. 3C and 3D show an example of a case where carbon fibers seem to be in contact with each other when seen from a certain angle but are not in contact with each other when seen from another angle. Meanwhile, a material extending two-dimensionally as in FIG. 3E seems to be in contact with an upper material seen from any angle if they seem to be in contact with each other when seen from a certain angle, and they are actually in contact with each other.

Note that the volume of a material extending two-dimensionally is to be focused on here. For example, the area of the two-dimensional carbon 103 in FIG. 3E is 2.2 times as large as a surface area of the carbon fibers 101 in the corresponding region in FIG. 3A; however, if the thickness is sufficiently small, the volume of the two-dimensional carbon 103 is smaller than that of all the carbon fibers 101 in FIG. 3A.

For example, in the case where the two-dimensional carbon 103 is formed of 10 graphenes, its thickness is 3.4 nm, and when the two-dimensional carbon 103 is formed of a smaller number of graphenes, its thickness is less than 3.4 mn. Accordingly, in the case that the radiuses of the carbon fibers 101 are greater than or equal to 3.86 nm, the volume is larger when the carbon fibers are used. The radius of a carbon fiber or any other material extending one-dimensionally is actually greater than 5 nm; thus, even larger volume is required.

Figure 3E:
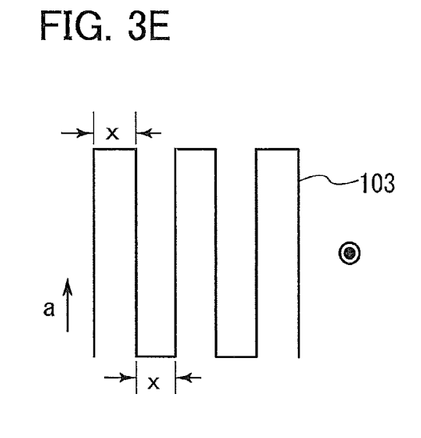
Figure 3F:
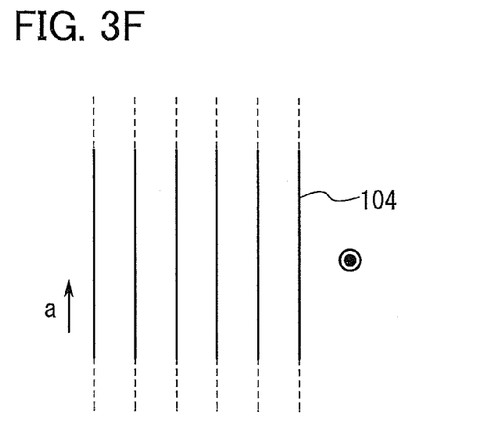

Although FIG. 3E illustrates the case where the material extending two-dimensionally has a structure bent in a special shape, in general, the material extends two-dimensionally within a considerable range. For example, there is a case as illustrated in FIG. 3F, where two-dimensional carbon 104 arranged at regular intervals in the direction "a" extends infinitely. In such a case, under the assumption that there is two-dimensional carbon extending two-dimensionally in a similar manner above the two-dimensional carbon 104, a contact state therebetween is examined.

Firstly, in the case where the upper two-dimensional carbon is arranged in the same direction as the two-dimensional carbon 104, it is difficult for the upper two-dimensional carbon to be in contact with the two-dimensional carbon 104 except in the case of overlapping with the two-dimensional carbon 104. However, the case where the upper two-dimensional carbon is arranged in the same direction as the two-dimensional carbon 104 hardly occurs, and usually there is a certain angle therebetween. Accordingly, contact between the upper two-dimensional carbon and the two-dimensional carbon 104 can be expected in most cases if the length of two-dimensional carbon in the direction "a" is infinite.

Furthermore, even if the length of the two-dimensional carbon 104 in the direction "a" is finite, the probability of the upper two-dimensional carbon being in contact with the two-dimensional carbon 104 is sufficiently high. For example, in the case where the length of the two-dimensional carbon 104 is equal to the length x, the two-dimensional carbon 104 does not overlap with the upper two-dimensional carbon if an angle formed therebetween is greater than or equal to 0° and less than 45°, but overlaps therewith if the angle is greater than or equal to 45° and less than or equal to 90°. Thus, the probability of overlapping is 50% even in such a case. This value is significantly high as compared with 12.6% in the case of carbon fibers.

According to the above examination, it can be said that the probability of overlapping is nearly 90% if the length of the two-dimensional carbon in the direction "a" is greater than or equal to 5 times as large as the length x. It is preferable that x be greater than or equal to 1 time and less than or equal to 5 times as large as the size of an active material particle, and the length of two-dimensional carbon can be accordingly determined. In other words, a typical length of two-dimensional carbon is preferably greater than or equal to 1 time, further preferably greater than or equal to 5 times as large as an average value of the sizes of the active material particles.

The above examination is described using extremely brief models; however, it indicates that excellent characteristics can be obtained by using a material extending two-dimensionally as a conduction auxiliary agent. From these models, it can be easily understood that a conduction auxiliary agent extending two-dimensionally has a high probability of being in contact with active material particles and other conduction auxiliary agents and that an electrode including these has high conductivity. Needless to say, the improvement in conductivity based on the above principle can be applied to not only active material particles but also other particles with low conductivity.

DETAILED DESCRIPTION OF THE INVENTION

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

(Embodiment 1)

In this embodiment, a method for manufacturing a lithium ion secondary battery which is one embodiment of the present invention will be described. First, two-dimensional carbon which is to be used as a conduction auxiliary agent is manufactured. As a method for manufacturing the two-dimensional carbon, a CVD method (Patent Document 2), a coating method (Patent Document 3), or a method in which two-dimensional carbon is chemically separated from graphite (Non-Patent Document 1) may be used.

For example, in the case where a CVD method is used, a metal film of nickel, iron, or the like serving as a catalyst is formed over a substrate, the substrate is placed in a chamber and heated at a temperature of 600° C. to 1100° C., and a gas containing hydrocarbon, such as methane or ethane, is introduced into the chamber, so that a two-dimensional carbon film including 1 to 10 graphene sheets is provided over the substrate.

Next, the metal film is etched with acid or the like, whereby a self-supported two-dimensional carbon film is obtained. The obtained film is cut and processed into rectangles in which the length of one side is 1 μm to 100 μm.

In the case where a coating method is used, a sulfuric acid solution of potassium permanganate, hydrogen peroxide water, or the like is mixed into single crystal graphite powder to cause oxidation reaction; thus, a graphene oxide aqueous solution is obtained. The obtained graphene oxide aqueous solution is applied onto an appropriate substrate provided with a separation layer and dried. As the separation layer, a film of a metal which is soluble in acid, with a thickness of 1 nm to 100 nm, may be used.

Then, graphene oxide is reduced by high-temperature heating in vacuum, addition of a reducing agent such as hydrazine, or the like, so that a two-dimensional carbon film including 1 to 10 graphene sheets is obtained.

Next, the separation layer is etched with acid or the like, whereby a self-supported two-dimensional carbon film is obtained. The obtained film is cut and processed into rectangles in which the length of one side is 1 μm to 100 μm. Note that the processing into rectangles may be performed at the stage where the graphene oxide aqueous solution is applied onto the substrate and dried.

In a method using a reducing agent, reduction reaction proceeds from a surface; therefore, the reduction reaction can be terminated at an appropriate depth by controlling reaction time. In this state, reduced two-dimensional carbon is obtained at the surface, while graphene oxide remains in a deeper portion. Since graphene oxide is suspended in water, a self-supported film of two-dimensional carbon (insoluble in water) can be obtained by soaking the substrate in water. The graphene oxide dissolved in water can be collected and applied onto a substrate again.

In the case of using a chemical method for separating two-dimensional carbon from graphite, graphite is placed in a polar solvent such as chloroform, N,N-dimethylformamide (DMF), or N-methylpyrrolidone (NMP) and bonding between graphite layers is broken by ultrasonic vibration, so that two-dimensional carbon can be obtained.

It is considered to be difficult to obtain a planar two-dimensional carbon film by this method. However, since planarity is not required in the case of using two-dimensional carbon as a conduction auxiliary agent, poor planarity is not a problem. On the contrary, this method is more efficient than other methods in terms of productivity.

In cutting of the obtained self-supported two-dimensional carbon film, a layer of a material which is to be mixed with the two-dimensional carbon later, such as active material particles, is preferably applied onto one surface of the self-supported two-dimensional carbon film with a thickness of 10 nm to 100 nm. Although the two-dimensional carbon is likely to aggregate after being cut, aggregation can be prevented by providing a layer of another material on one surface thereof.

The two-dimensional carbon having an appropriate area manufactured in the above manner is mixed with a positive electrode active material and a binder, whereby a slurry is obtained. Other conduction auxiliary agents such as acetylene black may be additionally mixed as appropriate. As the positive electrode active material, lithium iron phosphate, lithium manganese phosphate, lithium manganese silicate, lithium iron silicate, or the like can be used; however, one embodiment of the present invention is not limited thereto. Positive electrode active material particles preferably have sizes within the range of 20 nm to 100 nm. Further, a carbohydrate such as glucose may be mixed at the time of baking of the positive electrode active material particles, so that the positive electrode active material particles are coated with carbon. This treatment can improve the conductivity.

Figure 4:
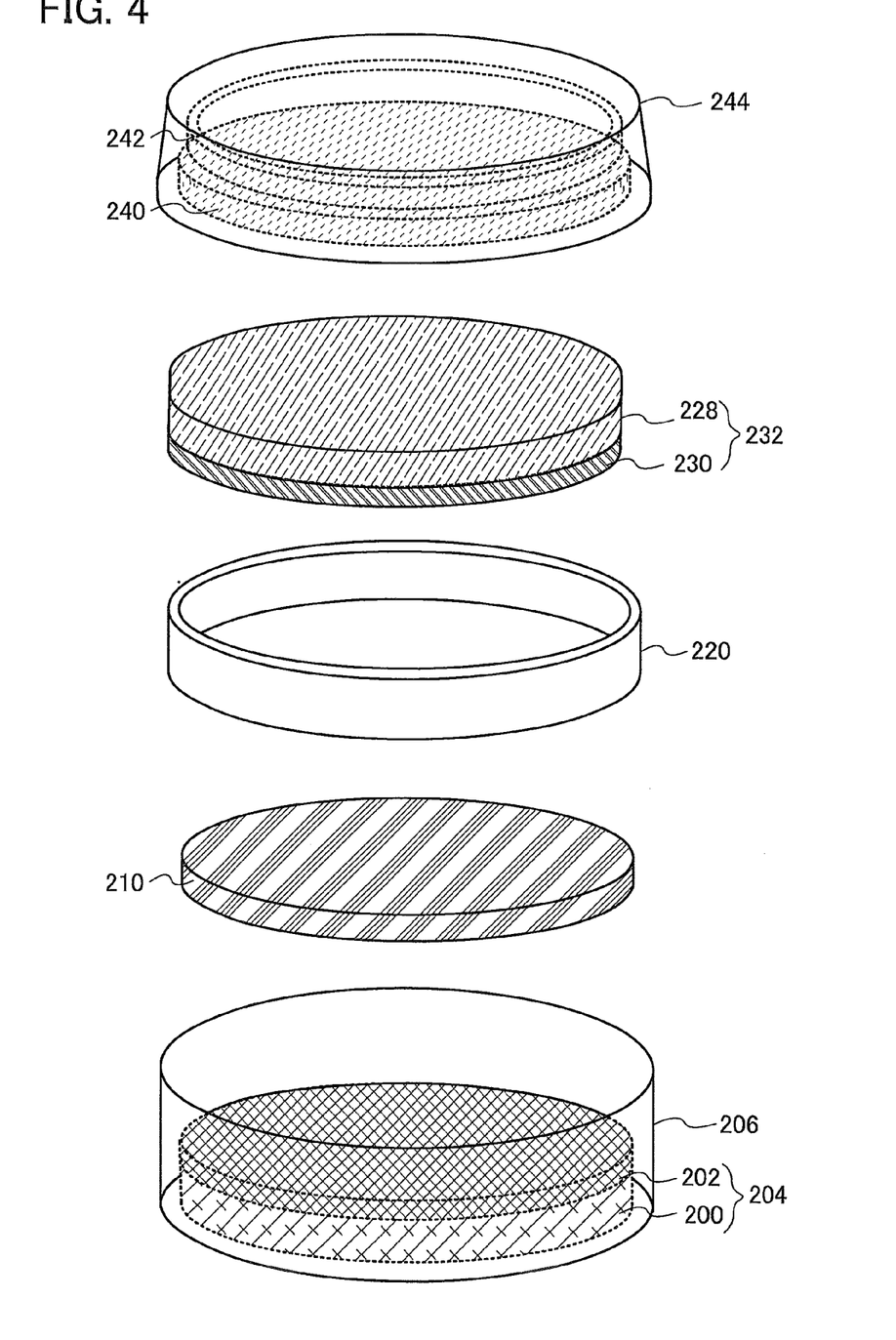
FIG. 4 illustrates an example of a secondary battery.

Description is made below with reference to FIG. 4. FIG. 4 shows the structure of a coin-type secondary battery. The above slurry is applied onto a positive electrode current collector 228, molded, and then dried, whereby a positive electrode active material layer 230 is formed. As a material of the positive electrode current collector 228, aluminum is preferably used.

As illustrated in FIG. 4, the coin-type secondary battery includes a negative electrode 204, a positive electrode 232, a separator 210, an electrolyte (not illustrated), a housing 206, and a housing 244. Besides, the coin-type secondary battery includes a ring-shaped insulator 220, a spacer 240, and a washer 242. As the positive electrode 232, the electrode that is obtained in the above step by forming the positive electrode active material layer 230 over the positive electrode current collector 228 is used.

The electrolyte in which $LiPF_6$ is dissolved in a mixed solvent of ethylene carbonate (EC) and diethyl carbonate (DEC) is preferably used; however one embodiment of the present invention is not limited hereto.

The negative electrode 204 includes a negative electrode active material layer 202 over a negative electrode current collector 200. As the negative electrode current collector 200, copper is used, for example. As a negative electrode active material, graphite, polyacene, or the like is used. The negative electrode active material layer 202 is preferably formed using such a material alone or a mixture of the material and a binder. Alternatively, two-dimensional carbon obtained by any of the above methods may be used as the negative electrode active material.

An insulator with pores (e.g., polypropylene) may be used for the separator 210. Alternatively, a solid electrolyte which can transmit lithium ions may be used.

The housing 206, the housing 244, the spacer 240, and the washer 242 each of which is made of metal (e.g., stainless steel) are preferably used. The housing 206 and the housing 244 have a function of electrically connecting the negative electrode 204 and the positive electrode 232 to the outside.

The negative electrode 204, the positive electrode 232, and the separator 210 are soaked in the electrolyte. Then, as illustrated in FIG. 4, the negative electrode 204, the separator 210, the ring-shaped insulator 220, the positive electrode 232, the spacer 240, the washer 242, and the housing 244 are stacked in this order inside the housing 206. The housing 206 and the housing 244 are subjected to pressure bonding. In such a manner, the coin-type secondary battery is manufactured.

(Embodiment 2)

As examples of an electrical appliance according to the present invention, a variety of dry batteries, storage batteries, and the like are given. As a conduction auxiliary agent for a positive electrode or a negative electrode of any of these batteries, the conduction auxiliary agent including two-dimensional carbon described in Embodiment 1 may be used for example.

In addition, as examples of an electrical appliance according to the present invention, electric vehicles, electric power tools, personal computers, mobile phones, and the like can be given. Such an electrical appliance is not always supplied with power by a wire and therefore includes a storage battery inside. As a conduction auxiliary agent for a positive electrode or a negative electrode of the storage battery, the conduction auxiliary agent including two-dimensional carbon described in Embodiment 1 may be used for example.

In particular, a storage battery with low internal resistance is required for applications where a large amount of current needs to be fed instantaneously or where a required current value varies greatly. Therefore, a sufficient effect can be obtained by using the present invention.

EXPLANATION OF REFERENCE

101: carbon fibers, 102: upper carbon fibers, 103: two-dimensional carbon, 104: two-dimensional carbon, 200: negative electrode current collector, 202: negative electrode active material layer, 204: negative electrode, 206: housing, 210: separator, 220: ring-shaped insulator, 228: positive electrode current collector, 230: positive electrode active material layer, 232: positive electrode, 240: spacer, 242: washer, and 244: housing.

This application is based on Japanese Patent Application serial no. 2010-183888 filed with Japan Patent Office on Aug. 19, 2010, the entire contents of which are hereby incorporated by reference.

What is claimed is:
1. A method for manufacturing an electrical appliance comprising:
   active material particles;
   a binder; and
   a conduction auxiliary agent comprising two-dimensional carbon;
   the method comprising:
      coating a solution comprising graphene oxide on a metal and drying the solution to form a first layer, wherein the first layer comprises the graphene oxide, and is directly in contact with the metal; and reducing the graphene oxide by heating so as to obtain the two-dimensional carbon in the first layer.

2. The method for manufacturing the electrical appliance according to claim 1, further comprising:
etching the metal to obtain a self-supported film of the first layer.

3. The method for manufacturing the electrical appliance according to claim 2, further comprising:
cutting the self-supported film into rectangular pieces whose length of one side is 1 micron to 100 microns.

4. The method for manufacturing the electrical appliance according to claim 2, further comprising:
coating a second layer comprising the active material particles on the self-supported film.

5. The method for manufacturing the electrical appliance according to claim 1, wherein the two-dimensional carbon consists of one to ten sheets of graphene.

6. The method for manufacturing the electrical appliance according to claim 1, wherein the solution is an aqueous solution.

* * * * *